(12) United States Patent
Li

(10) Patent No.: US 11,675,214 B2
(45) Date of Patent: Jun. 13, 2023

(54) GLASSES WITH SLIDING LATCH AT EAR TEMPLES TO CLOSE ORBITALS OF FRAME TO HOLD LENS

(71) Applicant: Jui-Chi Li, Tainan (TW)

(72) Inventor: Jui-Chi Li, Tainan (TW)

(*) Notice: Subject to any disclaimer, the term of this patent is extended or adjusted under 35 U.S.C. 154(b) by 0 days.

(21) Appl. No.: 16/664,748

(22) Filed: Oct. 25, 2019

(65) Prior Publication Data
US 2020/0133019 A1 Apr. 30, 2020

(51) Int. Cl.
*G02C 1/08* (2006.01)
*G02C 5/00* (2006.01)
*G02C 3/00* (2006.01)
*G02C 13/00* (2006.01)
*G02C 1/00* (2006.01)

(52) U.S. Cl.
CPC ............... *G02C 3/00* (2013.01); *G02C 1/10* (2013.01); *G02C 5/008* (2013.01); *G02C 13/001* (2013.01); *G02C 2200/08* (2013.01)

(58) Field of Classification Search
CPC . G02C 1/10; G02C 3/00; G02C 5/008; G02C 13/001; G02C 2200/08

USPC ............... 351/41, 96–98, 101, 140
See application file for complete search history.

(56) References Cited

U.S. PATENT DOCUMENTS

| 5,726,732 A | * | 3/1998 | Kobayashi | G02C 1/08 351/90 |
| 7,234,808 B2 | | 6/2007 | Bruck | |
| 7,712,894 B2 | | 5/2010 | Tsai | |
| 8,313,191 B2 | * | 11/2012 | Rothstein | G02C 5/10 351/97 |
| 8,469,510 B2 | | 6/2013 | Belbey et al. | |
| 8,534,830 B2 | | 9/2013 | Taylor et al. | |
| 8,911,075 B2 | * | 12/2014 | Chen | G02C 5/22 351/90 |
| 2014/0226121 A1 | * | 8/2014 | Schmidt | G02C 1/06 351/140 |
| 2014/0300854 A1 | * | 10/2014 | Fox | G02C 1/08 351/47 |

FOREIGN PATENT DOCUMENTS

GB 957697 5/1964

* cited by examiner

*Primary Examiner* — Darryl J Collins
(74) *Attorney, Agent, or Firm* — Charles R. Cypher

(57) ABSTRACT

Eyewear for releasably receiving a lens has a joint sleeve for holding the lens in place.

4 Claims, 8 Drawing Sheets

GLASSES WITH SLIDING LATCH AT EAR TEMPLES TO CLOSE ORBITALS OF FRAME TO HOLD LENS

BACKGROUND OF THE INVENTION

The present invention relates to eyewear and more particularly to an eyewear frame where it is relatively simple and easy to replace the one or more lenses held by the eyewear frame.

It is very common for eyewear frames to use threaded fasteners to join the portions of the frame together to surround and hold the one or more lenses of the eyewear in place in the frame. While threaded fasteners make a secure connection, they generally require the use of a special driver not commonly found as the threaded fasteners are generally very small. The threaded fasteners are also prone to stripping if the frame portions are opened and closed often. Thus, it is typical in frames that are designed to be used with interchangeable lenses to not use threaded fasteners to join the frame portions around the one or more lenses.

The present invention provides a new and unique arrangement of frame parts to securely hold one or more lenses of the eyewear in place in the frame.

SUMMARY OF THE INVENTION

It is an object of the present invention to provide an eyewear frame which can hold a lens in place or allow the lens to be released from the frame through the movement of a joint or coupling sleeve that slides along the eyewear frame. The present invention allows for the secure engagement of the lens with the frame while allowing for the easy removal of the lens without the need of special tools.

In one preferred embodiment of the present invention, the frame holds at least one lens, and the lens is releasably coupled to the frame, and the frame has a joint or coupling sleeve that is disposed on the frame and is slidingly movable from a first extended position where the joint sleeve engages the frame to hold the lens in place, to a second retracted position where the joint sleeve does not engage the frame in a manner that can hold the lens in place.

In one preferred embodiment of the present invention, the frame has at least one orbital, and a lens is releasably received in the orbital of the frame. The orbital has an upper brow portion and a lower cheek portion. The upper brow portion has a first end portion at the outer lateral portion of the frame where the brow portion is joined to the temple arm, and the lower cheek portion has a second joint portion at the outer lateral portion of the frame. The first end portion and the second joint portion are formed with corresponding recesses and protrusions that interlock with each other when the first end portion and the second joint portion are joined by a joint sleeve that engages both the first end portion and the second joint portion. The joint sleeve is disposed on the frame and is slidingly movable from a first extended position, where the joint sleeve engages the first end portion and the second joint portion such that the second joint portion interlocks with the first end portion, to a second retracted position where the joint sleeve releases one of the first end portion and the second joint portion and allows for the first end portion and the second joint portion to be moved away from each other.

In a preferred embodiment of the invention, the joint sleeve has a first abutting surface, and the temple arm has a second abutting surface and the first and second abutting surfaces engage each other when the joint sleeve is in the extended position, and the temple arm is an extended state.

In a preferred embodiment of the invention, the first end portion and the second joint portion are provided with corresponding convex portions and concave portions that interlock with each other when the joint sleeve engages the first end portion and the second joint portion in the extended position.

In a preferred embodiment of the invention, one of the first end portion and the second joint portion is provided with a side positioning groove, and the other of the first end portion and the second joint portion is provided with a side positioning member that corresponds to the side positioning groove, and a hook portion of the side positioning member engages the groove.

In a preferred embodiment of the invention, a coupling sleeve is used that has a tab that fits a notch in the lens, and when the coupling sleeve is in the extended position the tab engages the notch in the lens and holds the lens in place in the frame.

DETAILED DESCRIPTION OF THE PREFERRED EMBODIMENT

Figure 1:
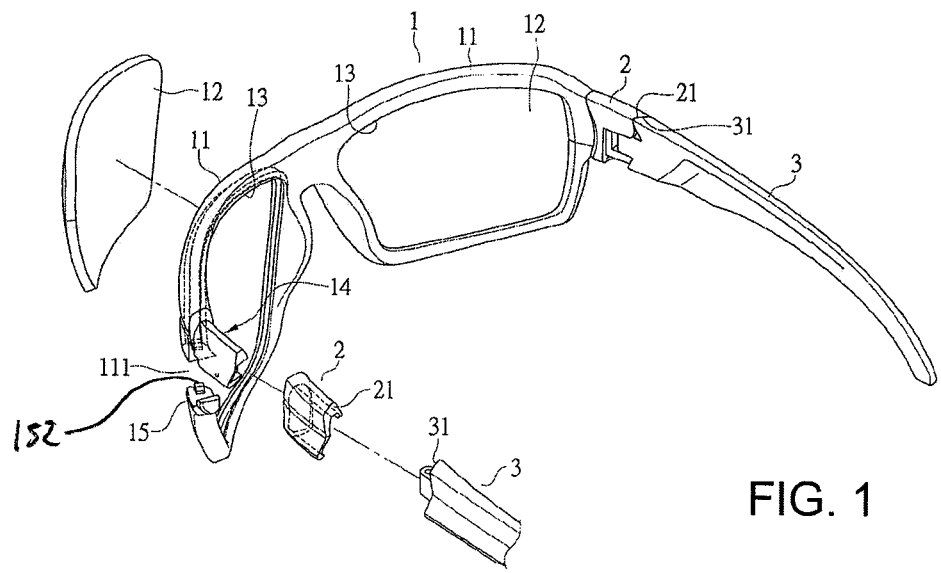
FIG. 1 is an exploded view of eyewear incorporating the present invention.

As shown in FIGS. 1-7, in one embodiment of the present invention, the eyewear of the present invention can have two corresponding left and right orbitals 11 that make up the front portion of the frame 1. Each of the orbitals 11 can have an opening 13 in which a lens 12 is placed or inserted. In the embodiments of FIGS. 1-7, the orbitals 11 surround the outer portion of the lens 12. The orbitals 11 are made up of an upper brow portion and a lower cheek portion. An inner groove is form in the orbital 11 to hold the lens in place. The inner groove is formed on the underside of the upper brow portion and on the upper side of the lower cheek portion.

Figure 2:
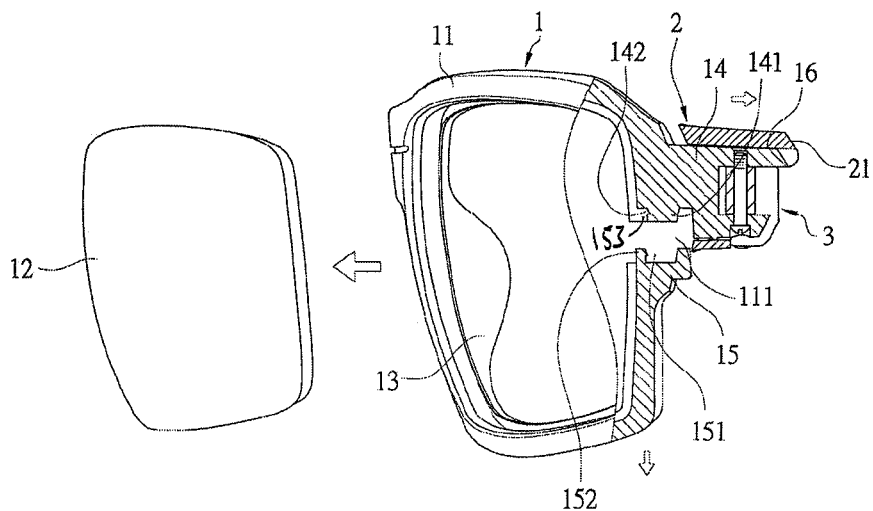
FIG. 2 is a sectional view of eyewear incorporating the present invention with the lens shown removed from the frame and one orbital portion of the frame in an open position.
Figure 3:
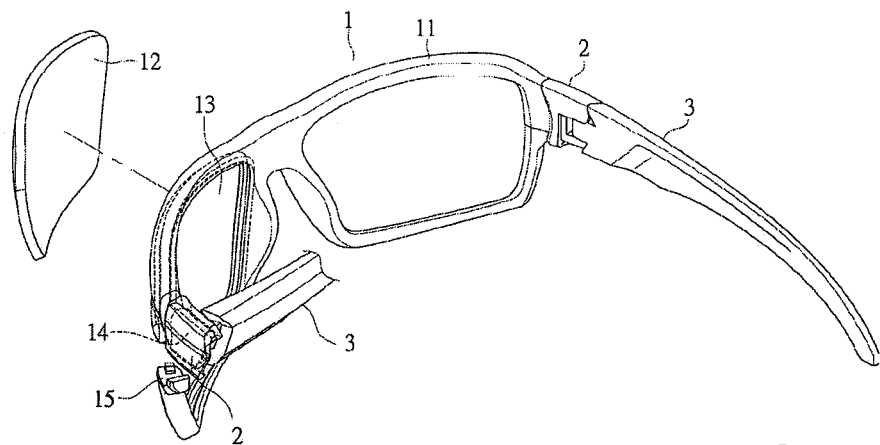
FIG. 3 is a perspective view of eyewear incorporating the present invention. The left temple portion is shown folded with respect to the brow portion of the frame. The right temple portion is shown extending from the brow portion of the frame. The left orbital of the frame is disposed in an open position, and the left lens is shown removed from the frame. The right orbital of the frame is disposed in the closed position and the right lens is secured in place in the frame. The left joint sleeve is shown retracted from the brow portion of the frame, allowing the left orbital of the frame to be open. The right joint sleeve is shown in its extended position, closing the right orbital of the frame.
Figure 4:
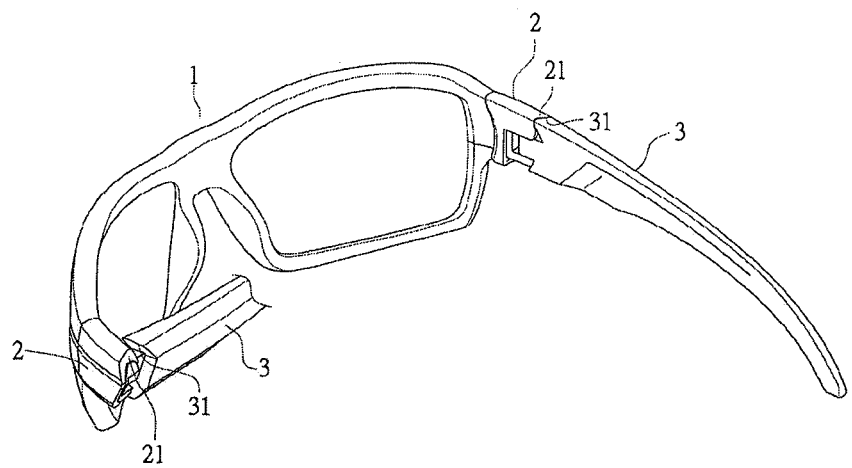
FIG. 4 is a rear perspective view of eyewear incorporating the present invention similar to FIG. 3, except the left lens is in place in the frame, the left orbital of the frame is disposed in the closed position, and the left joint sleeve is in the extended position.
Figure 5:
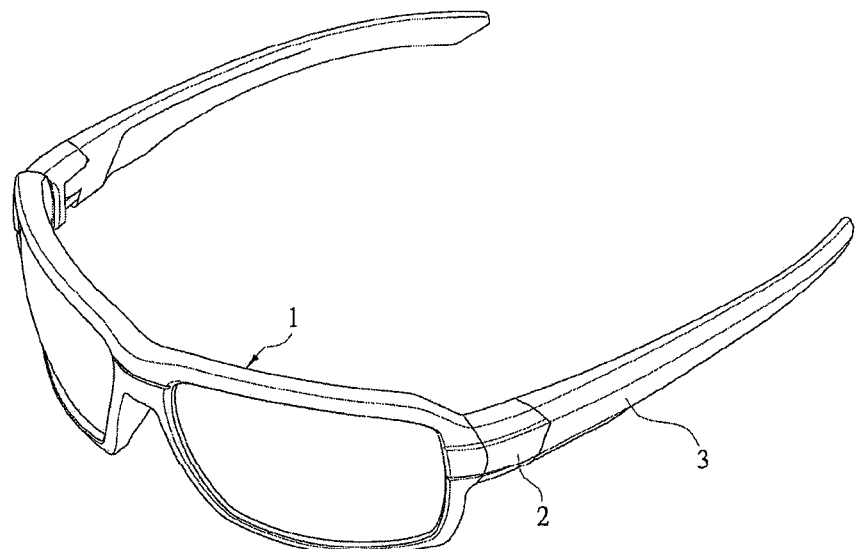
FIG. 5 is a front perspective view of eyewear incorporating the present invention. Both temples are shown in their extended positions with the joint sleeves in their extended positions and the orbitals are closed around the left and right lenses.
Figure 6:
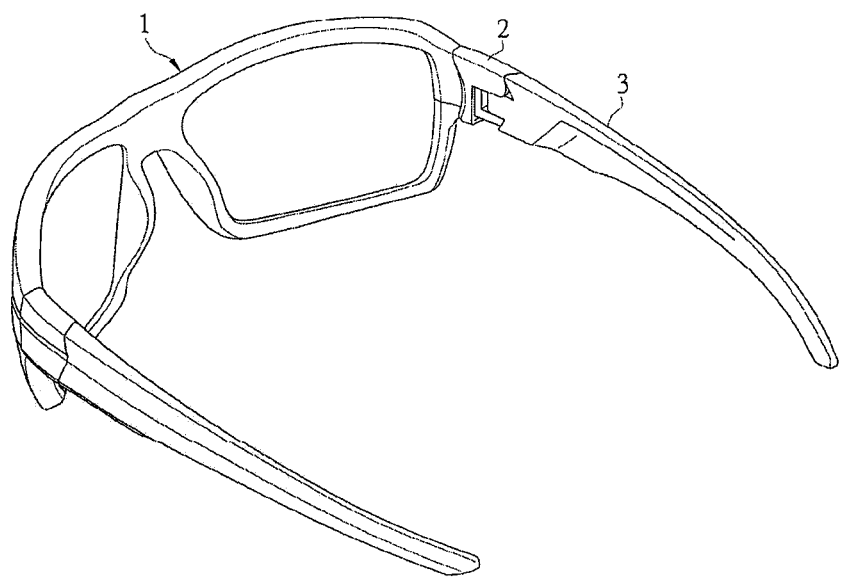
FIG. 6 is a rear perspective view of eyewear incorporating the present invention. Both temples are shown in their extended positions with the joint sleeves in their extended positions and the orbitals are closed around the left and right lenses.

As shown in FIG. 2, the left upper brow portion of the left orbital at the lateral edge of the frame has a first end portion 14. As shown in FIG. 1, the right upper brow portion of the right orbital is similarly formed with a first end portion 14. As also shown in FIG. 2, the left lower cheek portion of the left orbital at the lateral edge of the frame has a second joint portion 15. As shown in FIG. 1, the right lower cheek portion of the right orbital is similarly formed with a second joint portion 15. As shown in FIGS. 1-7 the same mechanism is used with the right orbital, and for the sake of brevity is not described here. When the second joint portion 15 is separated from the first end portion 14 a corresponding open end 111 is created between the upper brow portion and the lower cheek portion. Preferably, the first end portion 14 is formed to interlockingly engage with the second joist end portion 15 by forming recessions and protrusions on the members that can fit together.

Figure 7:
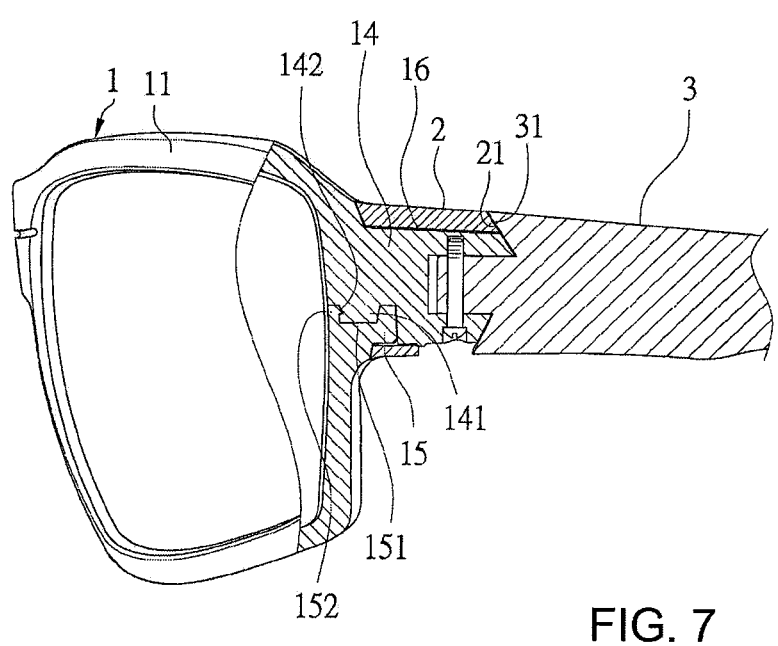
FIG. 7 is a sectional view of eyewear incorporating the present inventions with the lens shown in place in the frame and one orbital portion of the frame in the closed position.

As shown in FIG. 7, when the first end portion 14 and the second joint portion 15 are connected to each other they close the open end 111.

As shown in FIG. 2, the first end portion 14 is hingedly connected to temple arm 3 by means of a threaded fastener that is inserted through first end portion 14 and through the temple arm 3. This creates a pivoting connection between the frame 11 and the temple arm 3.

As shown in FIG. 1, according to one embodiment of the present invention, a joint sleeve 2 that completely surrounds a portion of the first end portion 14 of the orbital 11 is inserted over the terminal portion of the first end portion 14.

The joint sleeve 2 has a first abutting surface 21, and the temple arm 3 is provided with a second abutting surface 31 that interferes with the second abutting surface 31 when the temple 3 is pivoted on the hinge to its extended position and the joint sleeve 2 is in the extended position.

As shown in FIGS. 2 and 7, to insert a lens 12 into the orbital 11, the temple arm 3 is first placed in its folded position and the joint sleeve 2 is moved to its retracted position on the terminal portion of the first end joint 14. For purposes of this description the nose bridge of the frame 1 between the orbitals 11 is considered the central portion of the frame 1, with the lateral ends of the frame being distally related to the central portion. When the joint sleeve 2 is moved to its extended position to close the orbital 11 it is moved proximally with respect to the frame 1 from its retracted position to the extended position. When the joint sleeve 2 is moved to its retracted position to allow the opening of the orbital 11 and the removal of the lens 12, the joint sleeve 2 is moved distally from its extended position to the retracted position. With the temple arm 3 folded, such that the joint sleeve 2 can be disposed in the retracted position, the lens is inserted into opening 13. Then the upper brow and lower cheek pressing portions of the orbital 11 are pressed against the outer edge or rim of the lens 12, and the first end portion 14 and the second joint portion 15 are brought together to close the joint and to close the open end 111 of the orbital 11. Then the first end portion 14 and the second joint portion 15 are joined together by sliding movement of the joint sleeve 2 towards its extended position on the first end portion 14. The joint sleeve 2 engages an upper surface of the first end portion 14 and a lower surface of the second joint portion 15, preventing the first end portion 14 and the second joint portion 15 from separating. The temple arm 3 is then pivoted on the fastener hinge to its extended position with the first abutting surface 21 of the joint sleeve 2 and the second abutting surface 31 of the temple arm 3 interfacing. In this position, the joint sleeve 2 is restricted from moving to its retracted position by the temple arm 3.

When the lens 12 is to be removed, the temple arm 3 is first folded. As such the second abutting surface 31 of the temple arm 3 no longer resists the first abutting surface 21 of the joint sleeve 2, so that the joint sleeve 2 can move backward or distally to its retracted position. Then the first end portion 14 and the second joint portion 15 can be separated from each other, so that the open end 111 is created, and the diameter of the opening 13 of the orbital 11 for accommodating the lens 12 is increased. The lens 12 can then be removed from the opening 13.

As shown in FIGS. 2 and 7, in a preferred embodiment of the present invention, the first end portion 14 and the second joint portion 15 are provided alignment members. As shown in the drawings, the first end portion 15 is provided with a convex portion 141 and the second joint portion 15 is provided with a concave portion 151 corresponding that receives the convex portion 141. The concave and convex portions correspond to each other, and the convex portion 141 can be embedded in the concave portion 151. The placement of the concave and convex portions can be reversed. The interlocking engagement of the convex and concave portions helps align the first end portion 14 and the second joint portion with proximal and distal movement with respect to the frame 1.

In a preferred embodiment of the present invention, additional alignment members are provided in the form of a lateral positioning groove 142 and a side positioning member 152. As shown in FIG. 2 the lateral positioning groove 142 can be disposed on the first end portion 14, and a side positioning member 152 can be disposed on the second joint portion 15 corresponding to the side positioning groove 142. The side positioning member 152 can have a hook portion that fits into the lateral positioning groove 142. The engagement of the hook with the groove helps keep the orbital 11 stay closed, and the alignment members help align the first end portion 14 and the second joint portion 15 so that joint sleeve can slide over the first end portion 14 and the second joint portion 15.

As shown in FIGS. 1 and 2 the side positioning member 152 can be a protrusion or post that is of a smaller cross-section than the main body of the second joint portion 15. The side positioning member 152 fits into side positioning notch 153 in the first end portion 14. The fit of the side positioning member 152 in side positioning notch 153 helps to align the first end portion 14 and the second joint portion 15 with respect to inward and outward movement with respect to the lens 12 and proximal and distal movement with respect to the frame 1.

In a preferred embodiment of the present invention, portions of the first end portion 14 and the second joint portion 15 are formed such that they create a recessed portion 16 over which the joint sleeve 2 slides. Due to the presence of the depressed area or recessed portion 16, the surface of the joint sleeve 2 can be formed to appear to be generally flush with the outer surfaces of the orbital 11 and the temple arm 3 when the joint sleeve 2 is in the extended position.

Figure 8:
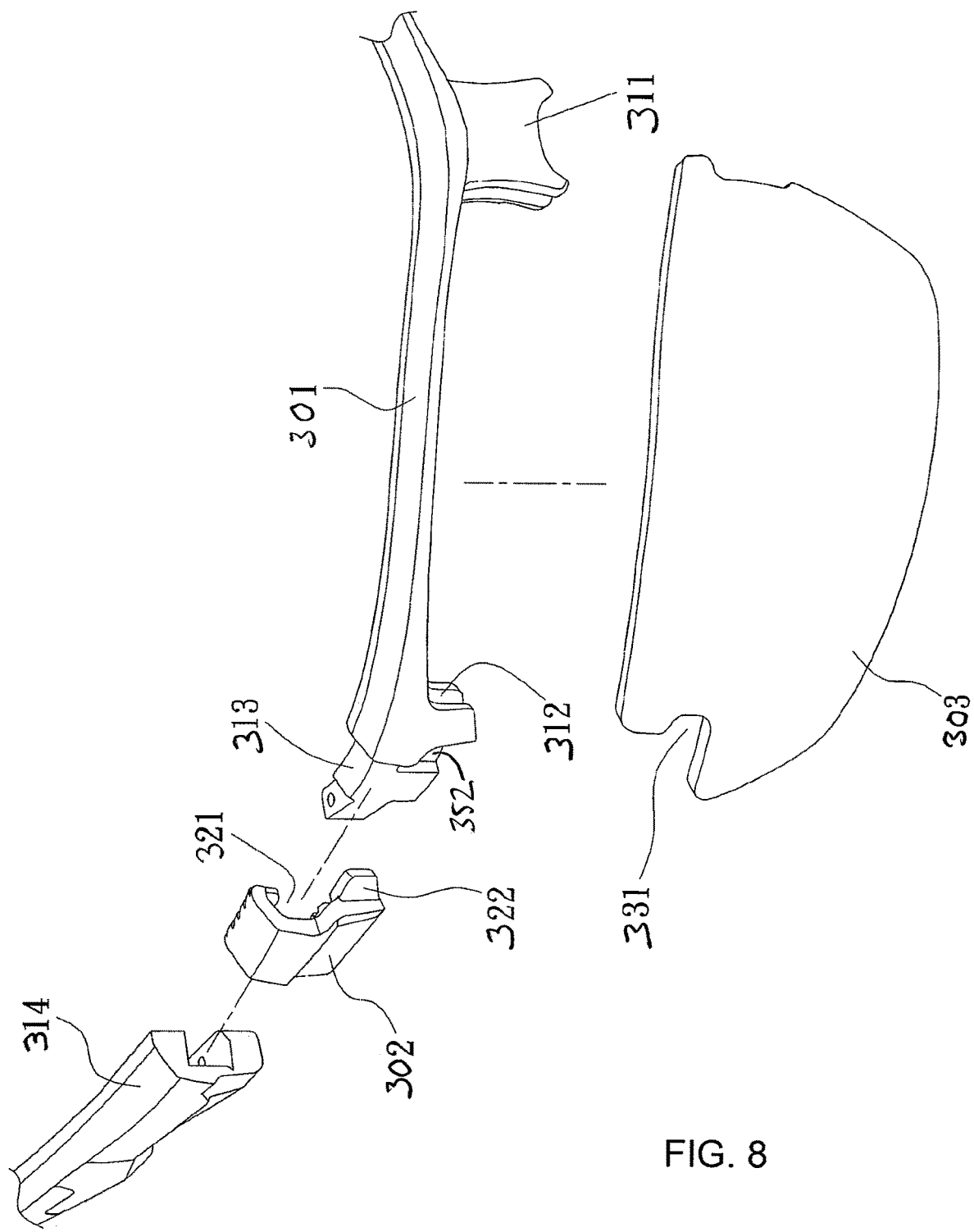
FIG. 8 is an exploded view of eyewear incorporating the present invention.

As shown in FIG. 8, the present invention can be frame 301 lacking orbitals. The frame 301 can have a brow portion, a nose bridge portion 311 and temple arms 314. In FIGS. 8-11, only a portion of the frame 301 is shown and the left temple arm is not shown but it is similar to the right temple arm. The left portion of the frame 301 is similar to the right portion of the frame and is not shown. The proximal portion of lens 303 has a notch for engaging a protrusion on the nose bridge portion 311. While the lens 303 shown only extends to the nose bridge portion 311, the lens could extend from one lateral end of the frame to the other and be of a single lens design. Other means for holding the lens 303 to the central portion of the frame 301 are also possible such as fasteners and tongue and groove connections. The nose bridge portion 311 can also be eliminated.

Figure 9:
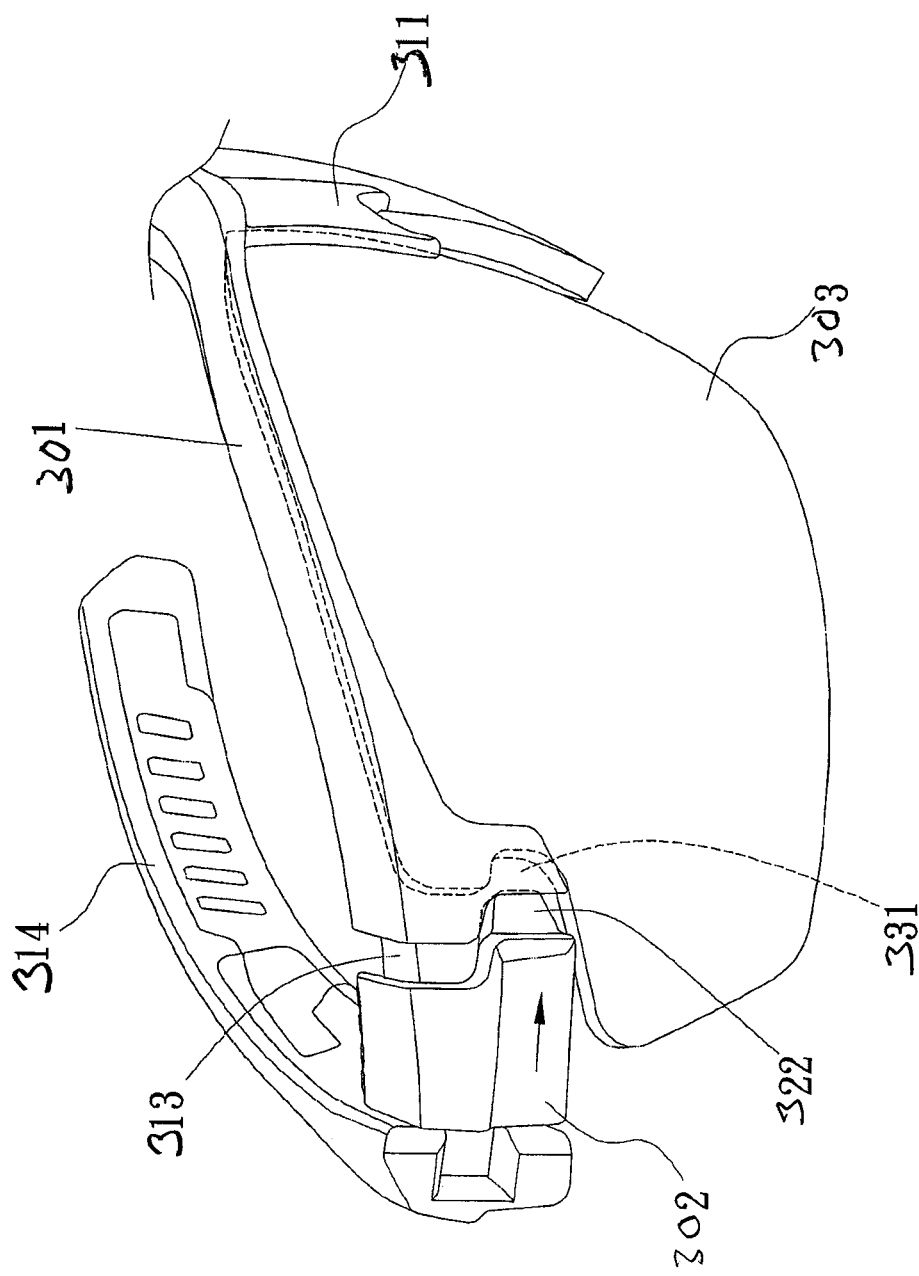
FIG. 9 is a front perspective view of a portion of eyewear incorporating the present invention. The right temple portion is shown folded with respect to the brow portion of the frame. A lens is shown in place in the right orbital portion of the frame. The right lens is not yet secured in place in the frame, as the locking sleeve is in the retracted position.

As shown in FIG. 9, a recessed groove can be for formed on the lower portion of the frame 301 to receive the top rim of the lens 303 to help hold the lens in place. The distal lateral ends of the frame 301 are formed with sliding sections 313 that receive the coupling sleeve 302. The sliding sleeve is clamped onto the frame 301. The coupling sleeve 302 has a hook portion that creates a recess or sliding groove 321 that receives the sliding section 313 and engages the sliding section 313 of the frame 301 with a snap-fit.

The sliding sleeve 302 also has a projecting tab 322 that fits in an indent 352 in the sliding section 313 of the frame and the lateral or distal portion of the frame 301. The fitting of the tab 322 in the indent 352 of the sliding section helps to securely hold the coupling sleeve 302 to the frame 301. The coupling sleeve 302 can slide along the sliding section 313 of the frame 301, and the protruding tab 322 slides in the indent 352. The projecting tab is centrally located and below the sliding groove 321. A depending flange from the top of the sliding sleeve 302 engages a rear surface of the frame to help with the snap fit and the engagement of the sliding sleeve 302 with the sliding section 313 of the frame 301.

The lateral end of the frame 301 is formed with front and back side walls with a space or chute 312 between them through which can receive the projecting tab 322 of the coupling sleeve 302. The front and back side walls held hold the lens 303 in place, and prevent front and rearward movement of the lens.

When the lens is properly positioned in the frame 301, the protruding tab can engage the recess or notch 331 in the lens 303 to hold the lens in place and prevent the lens from downward movement and distal movement with respect to the frame 301.

A front abutting surface of the temple arm 314 can engage a rear abutting surface of the coupling sleeve 302 when the temple arm 314 is an extended position to hold the coupling sleeve 302 in the extended position. When the temple arm 314 is folded on hinged connection with the brow portion of frame 301, the temple arm no longer abuts the coupling sleeve and the coupling sleeve 302 can be moved to a retracted position to allow the lens 303 to be removed and replaced.

Figure 10:
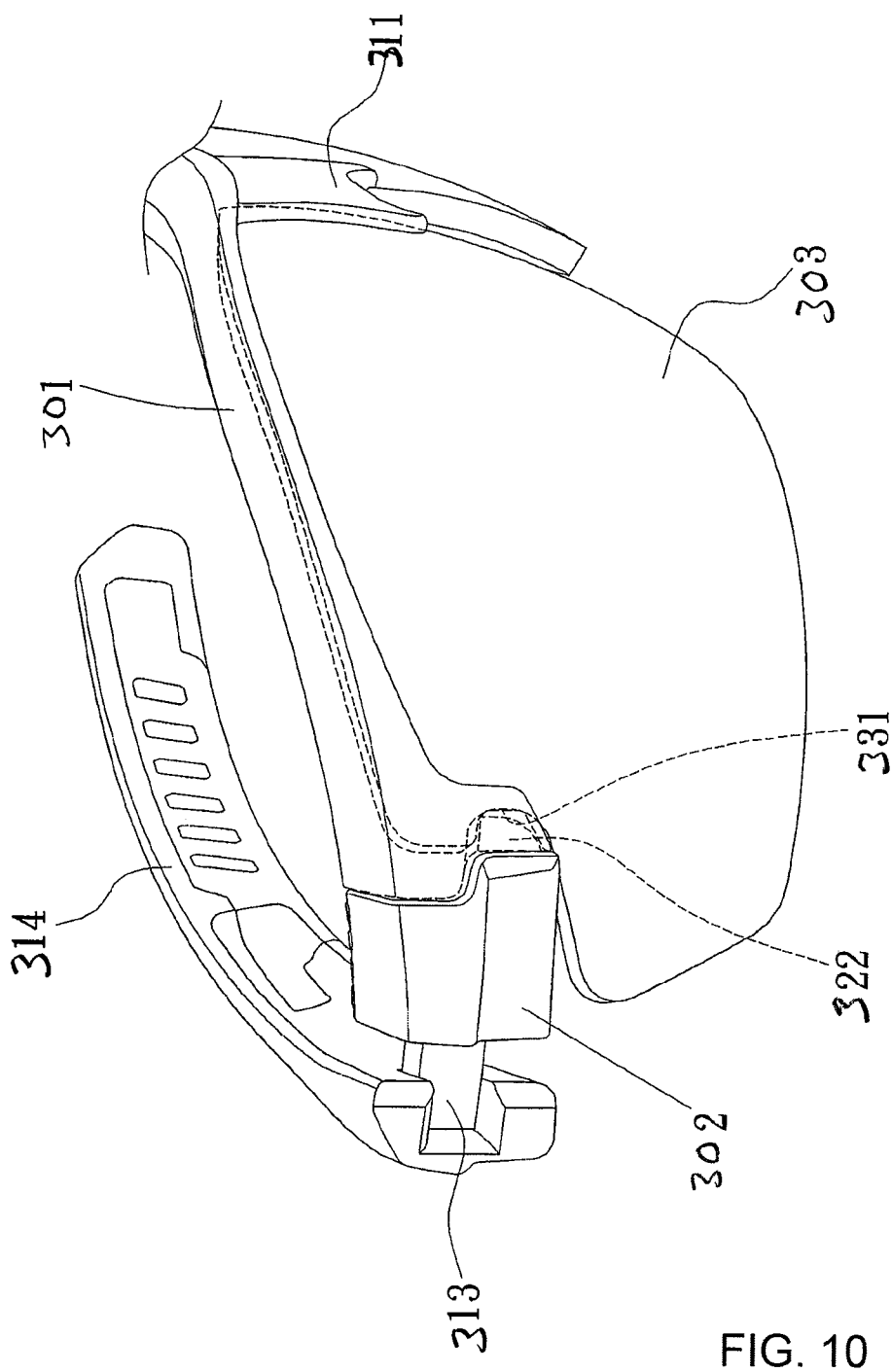
FIG. 10 is a front perspective view of a portion of eyewear incorporating the present invention. The right temple portion is shown folded with respect to the brow portion of the frame. A lens is shown in place in the right orbital portion of the frame. The right lens is secured in place in the frame, as the locking sleeve is in the extended position.
Figure 11:
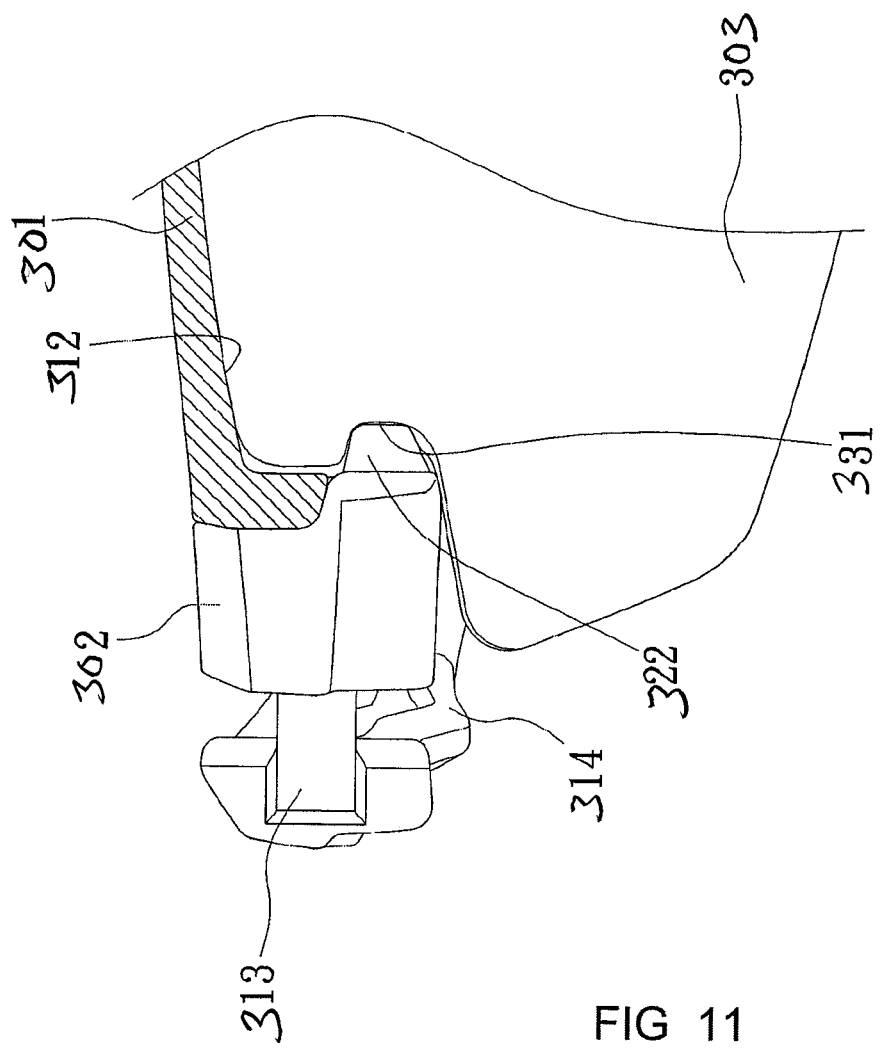
FIG. 11 is a partial sectional view of a portion of eyewear incorporating the present invention with the lens shown secured to the frame.

As shown in FIG. 9, the arrow on the coupling sleeve 302 shows the direction of travel of the sliding sleeve to move the coupling sleeve 302 into the extended position. In FIG. 9, the coupling sleeve 302 is in the retracted position. In FIGS. 10 and 11, the coupling sleeve 302 is shown in the extended position.

I claim:

1. Eyewear comprising:
a frame having at least one orbital;
a lens releasably received in the orbital of the frame; wherein
the orbital has an upper brow portion and a lower cheek portion, the upper brow portion having a first end portion at an outer lateral portion of the frame where the upper brow portion is joined to a temple arm, and the lower cheek portion has a second joint portion at the outer lateral portion of the frame, with the first end portion and the second joint portion being formed with corresponding recesses and protrusions that interlock with each other when the first end portion and the second joint portion are joined by a joint sleeve that engages both the first end portion and the second joint portion, and
where the joint sleeve is disposed on the frame and is slidingly movable in a non-rotating manner along the first end portion of the upper brow portion from a first extended position where the joint sleeve engages the first end portion and the second joint portion such that the second joint portion interlocks with the first end portion, to a second retracted position where the joint sleeve releases one of the first end portion and the second joint portion and allows for the first end portion and the second joint portion to be moved away from each other.

2. The eyewear of claim 1, wherein:
the joint sleeve has a first abutting surface, and the temple arm has a second abutting surface and the first and second abutting surfaces engage each other when the joint sleeve is in the extended position, and the temple arm is an extended state.

3. The eyewear of claim 1, wherein:
the first end portion and the second joint portion are provided with corresponding convex portions and concave portions that interlock with each other when the joint sleeve engages the first end portion and the second joint portion and the joint sleeve is in the first extended position.

4. The eyewear of claim 1, wherein:
wherein one of the first end portion and the second joint portion is provided with a side positioning groove, and the other of the first end portion and the second joint portion is provided with a side positioning member that corresponds to the side positioning groove, and a hook portion of the side positioning member engages the groove.

* * * * *